US010546268B2

(12) United States Patent
Doherty et al.

(10) Patent No.: US 10,546,268 B2
(45) Date of Patent: Jan. 28, 2020

(54) RECIPIENT CUSTOMIZED DELIVERY PATHS FOR UNMANNED AERIAL VEHICLE DELIVERIES

(71) Applicant: INTERNATIONAL BUSINESS MACHINES CORPORATION, Armonk, NY (US)

(72) Inventors: Jessica P. Doherty, Poughkeepsie, NY (US); Heidi Lagares-Greenblatt, Jefferson Hills, PA (US); Justin A. McCoy, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 15/335,476

(22) Filed: Oct. 27, 2016

(65) Prior Publication Data

US 2018/0121876 A1  May 3, 2018

(51) Int. Cl.
*G06Q 10/08* (2012.01)
*B64C 39/02* (2006.01)
*G08G 5/00* (2006.01)

(52) U.S. Cl.
CPC ..... *G06Q 10/08355* (2013.01); *B64C 39/024* (2013.01); *G08G 5/006* (2013.01);
(Continued)

(58) Field of Classification Search
CPC ............. G06Q 10/083; G06Q 10/0835; G06Q 10/08355; G06Q 10/0833; B64C 39/024
(Continued)

(56) References Cited

U.S. PATENT DOCUMENTS 9,346,547 B2    5/2016  Patrick et al.
9,743,239 B1 *  8/2017  Mishra .................. H04W 4/023
(Continued)

FOREIGN PATENT DOCUMENTS

WO    WO-2016154950 A1 * 10/2016  ........... B64C 39/024

OTHER PUBLICATIONS

Scraper et. al., "Using a priori data for prediction and object recognition in an autonomous mobile vehicle"; Proceedings of SPIE, AeroSense 2003, 2003, Orlando, Florida, United States (Year: 2003).*

(Continued)

*Primary Examiner* — Kevin H Flynn
*Assistant Examiner* — Emmett K. Walsh
(74) *Attorney, Agent, or Firm* — Cantor Colburn LLP; William Kinnaman (57) ABSTRACT

Methods, systems and computer program products for creating customized delivery paths for unmanned aerial vehicle deliveries are provided. Aspects include receiving, from a delivery recipient, one or more delivery locations for a delivery of a package and receiving, from the delivery recipient, a flight plan associated with each of the one or more delivery locations, wherein at least one of the flight plans include an authorized path across a private property. Aspects also include receiving, from the delivery recipient, a set of delivery recipient preferences that are used to determine which of the one or more delivery locations should be used to deliver the package and storing, by a processor in a computer readable medium, the set of delivery recipient preferences for use in determining a delivery location for a package to the delivery recipient.

19 Claims, 9 Drawing Sheets

(52) U.S. Cl.
CPC ......... *G08G 5/0013* (2013.01); *G08G 5/0026* (2013.01); *G08G 5/0034* (2013.01); *G08G 5/0069* (2013.01); *G08G 5/0091* (2013.01); *B64C 2201/128* (2013.01)

(58) Field of Classification Search
USPC ........................................................ 705/338
See application file for complete search history.

(56) References Cited

U.S. PATENT DOCUMENTS

| | | | |
|---|---|---|---|
| 2014/0316243 A1 | 10/2014 | Niedermeyer | |
| 2015/0120094 A1* | 4/2015 | Kimchi | B64C 39/024 701/3 |
| 2015/0301150 A1* | 10/2015 | Stuckman | G01S 1/00 342/407 |
| 2015/0379468 A1* | 12/2015 | Harvey | G06Q 10/08355 705/338 |
| 2016/0033966 A1 | 2/2016 | Farris et al. | |
| 2016/0068264 A1 | 3/2016 | Ganesh et al. | |
| 2016/0068265 A1 | 3/2016 | Hoareau et al. | |
| 2016/0072804 A1 | 3/2016 | Chien et al. | |
| 2016/0104098 A1 | 4/2016 | Matula et al. | |
| 2016/0189101 A1 | 6/2016 | Kantor et al. | |
| 2016/0307447 A1* | 10/2016 | Johnson | G05D 1/0044 |
| 2017/0132566 A1* | 5/2017 | High | B64C 39/024 |
| 2017/0330145 A1* | 11/2017 | Studnicka | G06Q 10/0836 |
| 2018/0111683 A1* | 4/2018 | Di Benedetto | B64C 39/024 |
| 2019/0080287 A1 | 3/2019 | Kotake et al. | |

OTHER PUBLICATIONS

Doherty et al.; Pending U.S. Appl. No. 15/335,477; entitled "Recipient Customized Delivery Paths for Unmanned Aerial Vehicle Deliveries", filed Oct. 27, 2016.

List of IBM Patents or Patent Applications Treated as Related; (Appendix P), Filed Oct. 27, 2016; 2 pages.

* cited by examiner

RECIPIENT CUSTOMIZED DELIVERY PATHS FOR UNMANNED AERIAL VEHICLE DELIVERIES

BACKGROUND

The present invention relates generally to a system and method for specifying a delivery path for an unmanned aerial vehicle delivery and, more specifically, to a system and method for recipient customized delivery paths for unmanned aerial vehicle deliveries.

Many sellers and package delivery services are trying to incorporate the use of drones, or unmanned aerial vehicles (UAVs), for the delivery of packages to individuals. However, the delivery of packages via drone includes a unique set of challenges that are not present using traditional delivery methods. One of those challenges is that many of the users/buyers may not want to allow drones on some areas of their property.

SUMMARY

Embodiments include methods, systems and computer program products for creating customized delivery paths for unmanned aerial vehicle deliveries. Aspects include receiving, from a delivery recipient, one or more delivery locations for a delivery of a package. Aspects also include receiving, from the delivery recipient, a flight plan associated with each of the one or more delivery locations, wherein at least one of the flight plans include an authorized path across a private property. Aspects further include receiving, from the delivery recipient, a set of delivery recipient preferences that are used to determine which of the one or more delivery locations should be used to deliver the package. Aspects also include storing, by a processor in a computer readable medium, the set of delivery recipient preferences for use in determining a delivery location for a package to the delivery recipient.

Additional features are realized through the techniques of the present invention. Other embodiments and aspects of the invention are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features of embodiments of the invention are apparent from the following detailed description taken in conjunction with the accompanying drawings in which:

DETAILED DESCRIPTION

Embodiments of the present disclosure are directed to systems, methods and computer program products for creating customized delivery paths for unmanned aerial vehicle deliveries and for delivering a package by a drone using a customized delivery path. In exemplary embodiments, an individual is able to create one or more delivery paths across their property to one or more delivery locations. The delivery paths are communicated to retailers and to package delivery companies and are used by drones to deliver packages to the individual. In exemplary embodiments, the delivery locations can be determined based on a variety of factors that can include, but are not limited to, a characteristic of the package, a time of day of the delivery, a location of the individual at the time of the delivery, a weather condition at the time of the delivery and the like.

In exemplary embodiments, the individual can create the one or more flight paths using a variety of methods. In one embodiment, the individual can draw a flight path on a map of their property using a web-based user interface. In another embodiment, the individual can use a smartphone to capture a flight path as they walk along the flight path. In exemplary embodiments, the flight path can include the latitude and longitude along the path as well as a minimum and maximum flight speed and a minimum and maximum altitude for the drone along the path.

In exemplary embodiments, a delivery recipient can create a delivery path to share with the retailers and shipping companies in order to provide guidance on the flight path that the delivery recipient would prefer the drones to take based on certain conditions. As a result, the delivery recipient can visually tell if a drone is wondering around their house property or if the drone is taking a specific route for a delivery.

Figure 1:
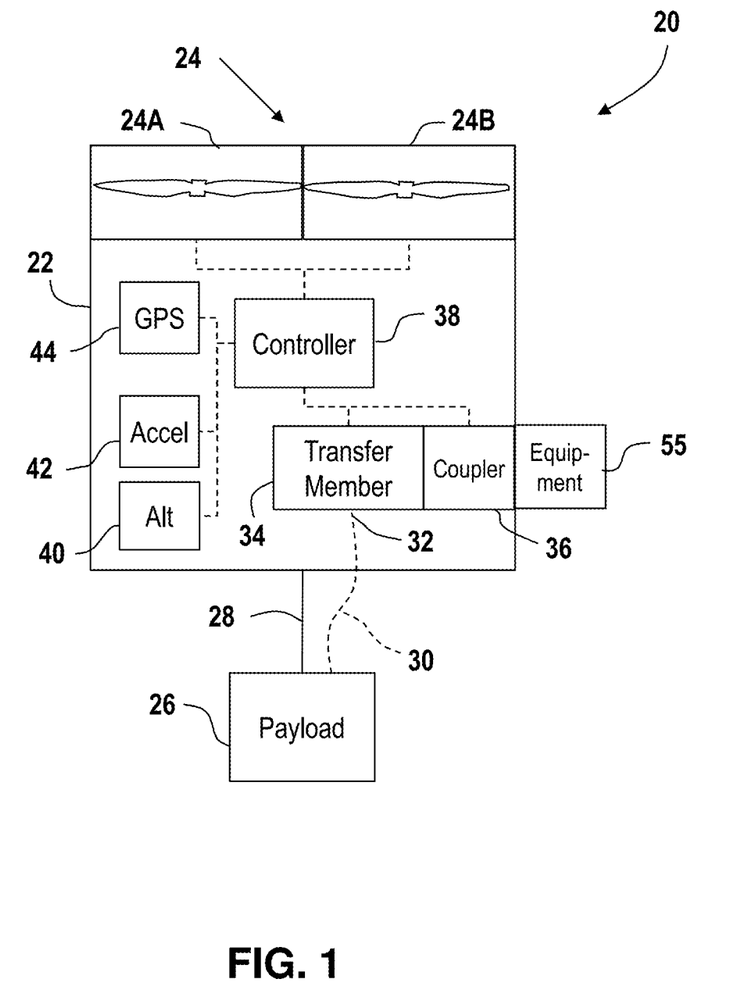
FIG. 1 depicts a block diagram of a drone in accordance with an embodiment.

Referring now to FIG. 1, an embodiment is shown of a drone 20 or unmanned aerial vehicle. As used herein, the term "drone" refers to an aerial vehicle capable of operating autonomously from a human operator to perform a predetermined function, such as deliver a payload or package for example. The drone 20 includes a fuselage 22 that supports at least one thrust device 24. In an embodiment, the drone 20 includes a plurality of thrust devices 24A, 24B, such as four thrust devices arranged about the periphery of the fuselage 22. In an embodiment, the thrust devices 24 include propeller member that rotates to produce thrust. The thrust devices 24 may be configurable to provide both lift (vertical thrust) and lateral thrust (horizontal thrust). The vertical and horizontal components of the thrust allow the changing of the altitude, lateral movement and orientation (attitude) of the drone 20.

In the exemplary embodiment, the fuselage 22 and thrust devices 24 are sized and configured to carry a payload 26 or package. The payload 26 being releasably coupled to the fuselage 22 by a first tether 28. As will be discussed in more detail herein, the payload 26 may also be coupled to a second tether 30. The second tether 30 is coupled on one end to the payload 26 and on an opposite end 32 to a transfer member 34. In the exemplary embodiment, the transfer member 34 is a transfer arm that extends from a side of the fuselage 22. In an embodiment, the transfer arm may be an expandable or extendable member that may be extended or retracted for the payload transfer process. The expandable transfer arm may be actuated by hydraulic, pneumatic, electromechanical (motor with a power screw) or with magnetic (solenoid or linear actuator) assemblies.

In an embodiment, the end 32 is movably or slidably coupled to the transfer member 34 to allow the end 32 to move from the transfer member 34 to another transfer member on another drone or a stationary docking station. In an embodiment, the movement of the end 32 is under the influence of gravity. In an embodiment, the transfer member 34 includes a coupling device 36. The coupling device 36 may couple data capture equipment 55, such as an image capture equipment, a video capture equipment, an audio capture equipment, a depth capture equipment, or any other type of data capture equipment.

The drone 20 includes a controller 38 having a processing circuit. The controller 38 may include processors that are responsive to operation control methods embodied in application code such as those shown in FIG. 6. These methods are embodied in computer instructions written to be executed by the processor, such as in the form of software. The controller 38 is coupled transmit and receive signals from the thrust devices 24, the transfer member 34 and the coupling device 36 to determine and change their operational states (for example, extend transfer member 34, change polarity of coupling device 36, adjust lift from thrust devices 24). The controller 38 may further be coupled to one or more sensor devices that enable to the controller to determine the position, orientation, and altitude of the drone 20. In an embodiment, these sensors may include an altimeter 40, a gyroscope or accelerometers 42 or a global positioning satellite (GPS) system 44.

Figure 2:
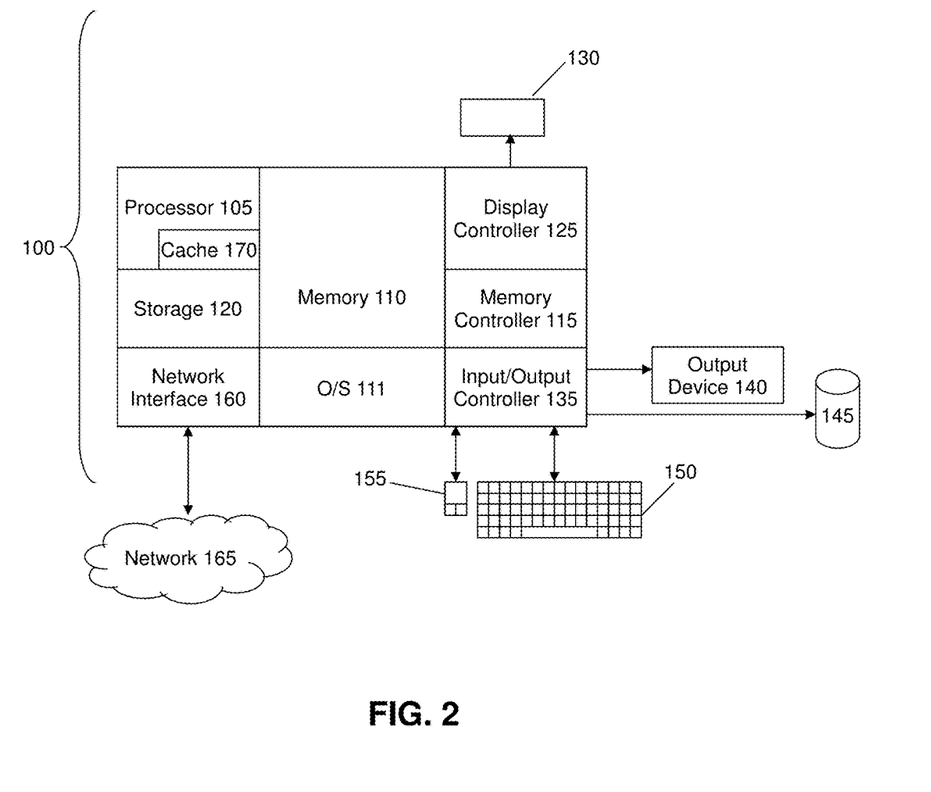
FIG. 2 depicts a block diagram of a controller for a drone in accordance with an embodiment.

FIG. 2 illustrates a block diagram of a controller 100 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose controller 38, such as a personal computer, workstation, minicomputer, or mainframe computer.

In some embodiments, as shown in FIG. 2, the controller 100 includes a processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors, cameras, microphones and the like. Input devices such as a conventional keyboard 150 and mouse 155 may be coupled to the I/O controller. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the controller 38, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1,L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The controller 100 may further include a display controller 125 coupled to a user interface or display 130. In some embodiments, the display 130 may be an LCD screen. In some embodiments, the controller 100 may further include a network interface 160 for coupling to a network 165. The network 165 may be an IP-based network for communication between the controller 38 and an external server, client and the like via a broadband connection. The network 165 transmits and receives data between the controller 38 and external systems. In an embodiment, the external system may be the UAV 20, wherein the transmitting and receiving of data allows the controller 100 to determine when a condition (e.g. a route deviation, a player's vital sign parameters). In some embodiments, the network 165 may be a managed IP network administered by a service provider. The network 165 may be implemented in a wireless fashion, e.g., using wireless protocols and technologies, such as WiFi, WiMax, satellite, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in controller 100, such as that illustrated in FIG. 2.

Figure 3:
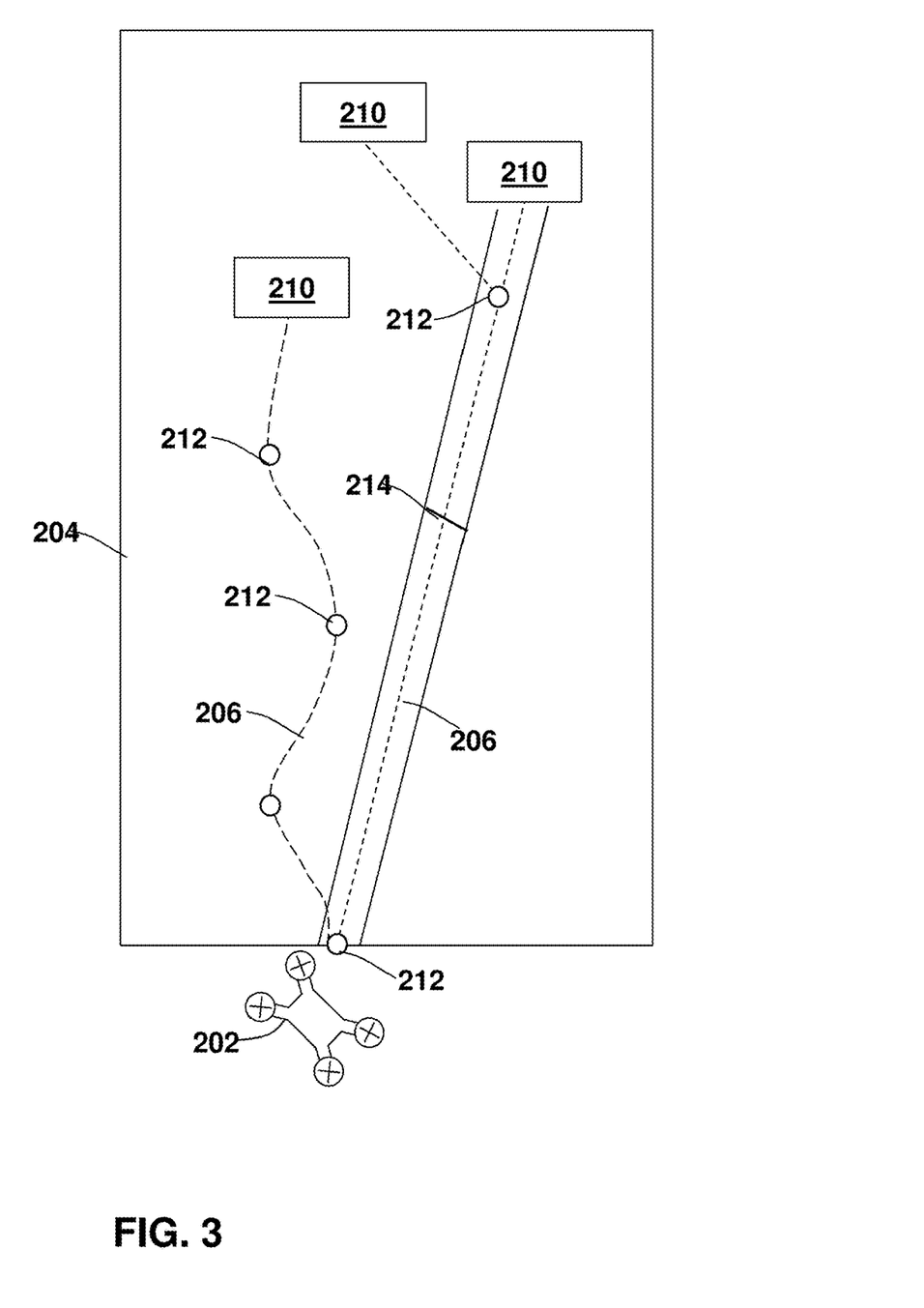
FIG. 3 depicts a plan view of a delivery system in accordance with an embodiment.

Referring now to FIG. 3, a plan view of a delivery system in accordance with an embodiment of this disclosure is shown. As illustrated, the system includes a drone 202 that is configured to deliver a package to an individual at one of multiple delivery locations 210 on a property 204. In exemplary embodiments, the property 204 can be a parcel of private property that is associated with the individual and the delivery locations 210 can be disposed on various parts of the property 204. For example, the delivery locations 210 can include a front door step, a balcony, a deck, a driveway, or any other suitable location.

In exemplary embodiments, the drone 202 is configured to follow a flight path 206 across the property 204 to deliver a package to one of the delivery locations 210. In exemplary embodiments, the flight path 206 includes a width 214, a maximum altitude, a minimum altitude, a maximum flight speed and a minimum flight speed along the flight path 206. The flight path 206 can include one or more waypoints 212 along the flight path 206.

Figure 4:
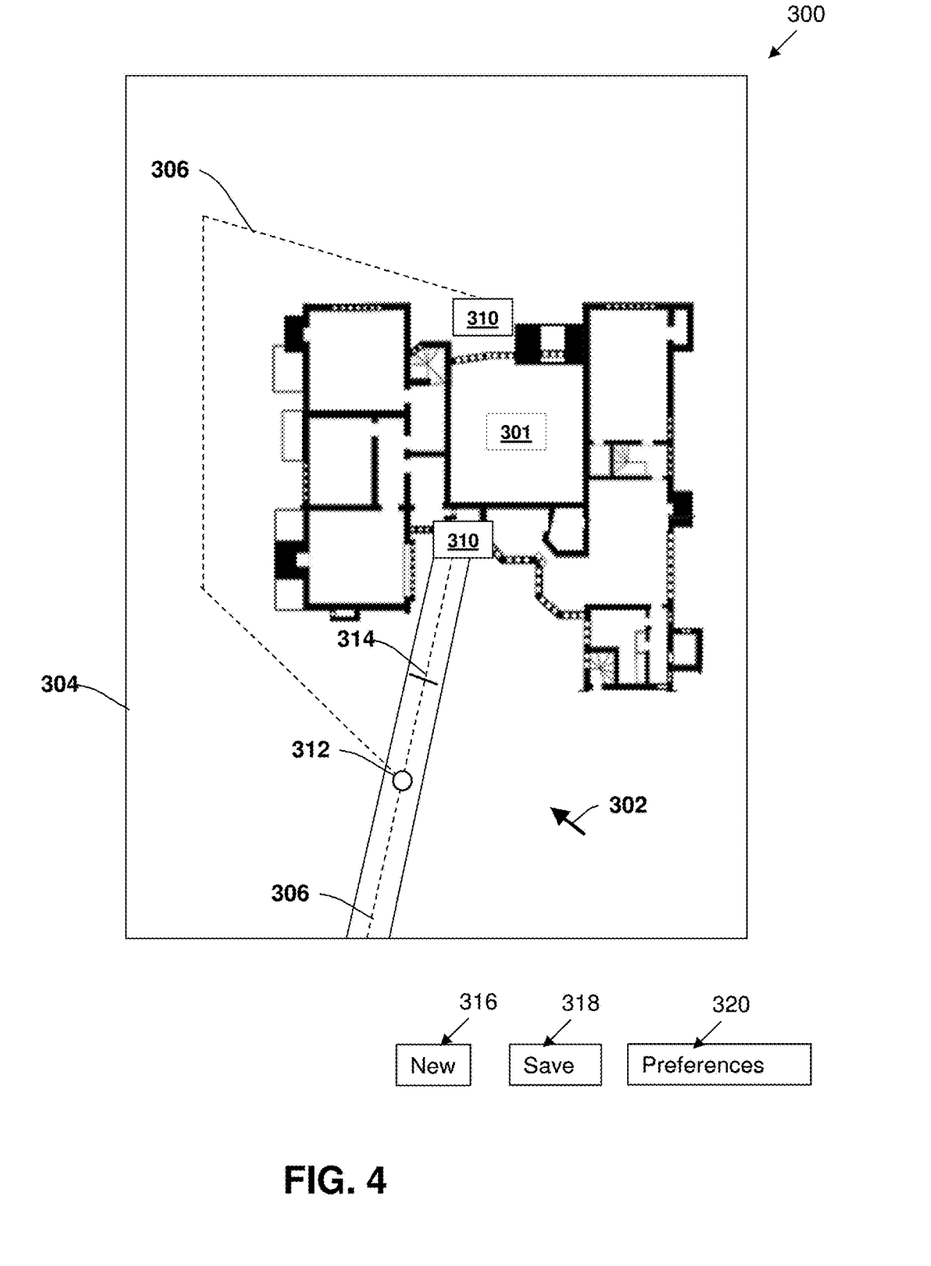
FIG. 4 depicts a user interface of a system for creating customized delivery paths for drone deliveries in accordance with an embodiment.

Referring now to FIG. 4, a user interface 300 of a system for creating customized delivery paths for drone deliveries in accordance with an embodiment is shown. As illustrated, the user interface 300 includes a display of a property 304 that includes a building 301, such as a house, an apartment building or an office. The user interface 300 also includes a cursor 302 that can be used to create delivery paths 306 to one or more delivery locations 310 at various locations on the property 304. The delivery locations 310 can include a front door step, a balcony, a deck, a driveway, or any other suitable location on or around the building 301.

In exemplary embodiments, the delivery paths 306 can be created using the cursor 302 and one or more command buttons, such as the new button 316, the save button 318, and the preferences button 320. In one embodiment, the preferences button 320 can be used to enter a width 314, a maximum altitude, a minimum altitude, a maximum flight speed and a minimum flight speed along the flight path 306. The flight path 306 can include one or more waypoints 312 along the flight path 306. In one embodiment, the waypoints 312 can be specific points along the flight paths 306 where one or more flight paths 306 intersect or diverge.

Figure 5:
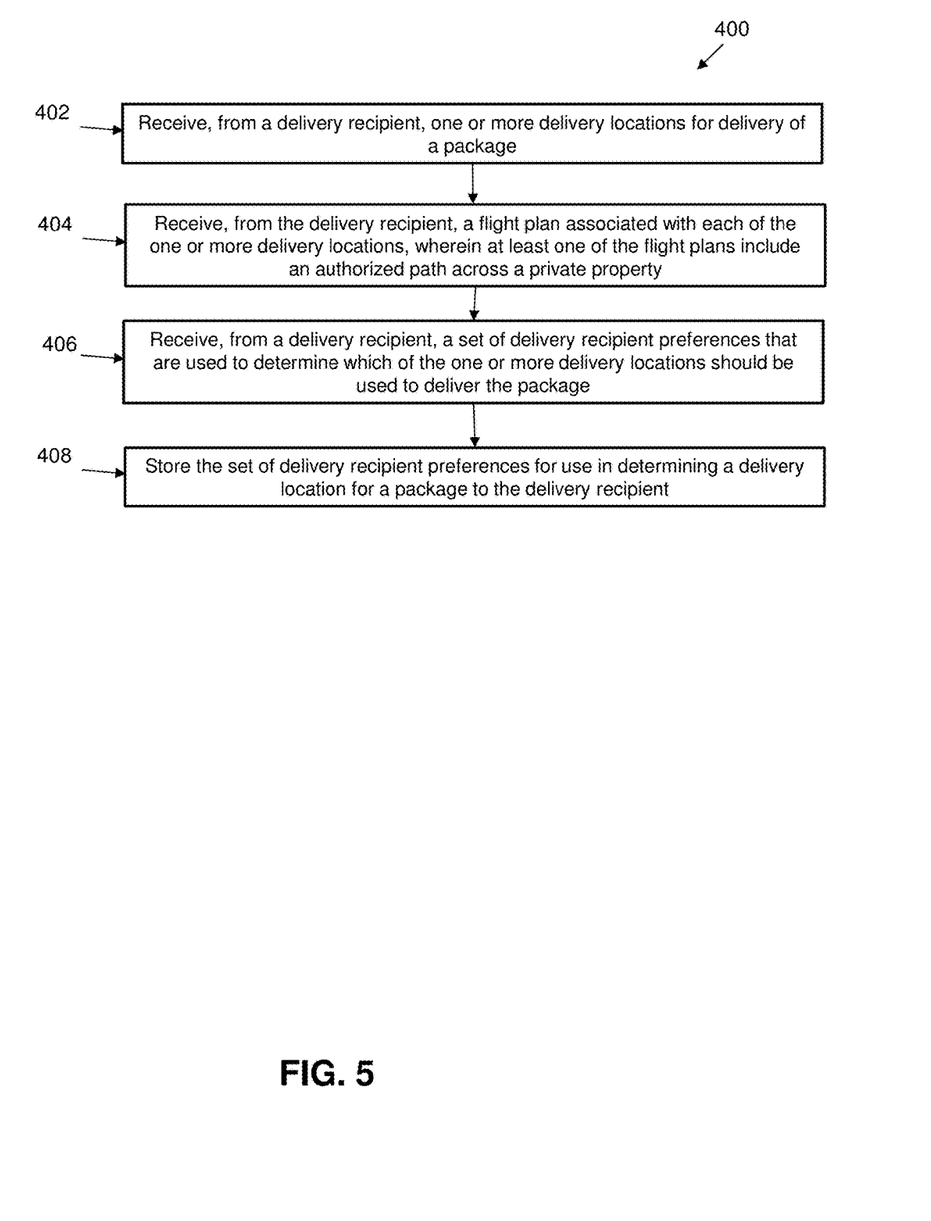
FIG. 5 depicts a flow diagram of a method for creating customized delivery paths for drone deliveries in accordance with an embodiment.

Referring now to FIG. 5, a flow diagram of a method 400 for creating customized delivery paths for drone deliveries is depicted. The method 400 includes receiving, from a delivery recipient, one or more delivery locations for a delivery of a package, as shown at block 402. In one embodiment, the delivery locations can be provided by the delivery recipient marking the delivery locations on a map using a user interface, such as the one shown in FIG. 4. In another embodiment, the delivery locations can be provided by the delivery recipient marking the delivery locations using an application on a mobile device, such as the one shown in FIG. 7.

Next, as shown at block 404, the method 400 includes receiving, from the delivery recipient, a flight plan associated with each of the one or more delivery locations. In exemplary embodiments, the flight plans include an authorized path across a private property and can also include a width, a maximum altitude, a minimum altitude, a maximum flight speed and a minimum flight speed along the flight path. In one embodiment, the flight paths can be provided by the delivery recipient drawing the flight paths on a map using a user interface, such as the one shown in FIG. 4. In another embodiment, the flight paths can be provided by the delivery recipient capturing the flight paths using an application on a mobile device, such as the one shown in FIG. 7. For example, a delivery recipient can capture a flight path using a mobile device by walking along the desired flight path and having the mobile device record the flight path.

Next, as shown at block 406, the method 400 includes receiving, from the delivery recipient, a set of delivery recipient preferences that are used to determine which of the one or more delivery locations should be used to deliver the package. In exemplary embodiments, the delivery preferences can include correlations between the one or more delivery locations and one or more of a weather condition at a time of the delivery, a location of the delivery recipient at a time of the delivery, a time of the delivery, and one or more characteristics of the package. Next, as shown at block 408, the method 400 includes storing the set of delivery recipient preferences for use in determining a delivery location for a package to the delivery recipient.

In exemplary embodiments, a delivery recipient can have specific delivery instructions that use different delivery locations and delivery paths depending on certain conditions (weather, time of the day, etc.). In addition, the system can also track the location of the delivery recipient automatically in order to determine preferred delivery location and delivery path. Based on the conditions and the user's location, the delivery recipient may have different paths for the delivery. For example, if the delivery recipient is at home at the time of the delivery of a package, he may want the drone to delivery at the front door. However, if the delivery recipient is not home, he may prefer that the delivery be on their back porch. Likewise, the delivery path, in addition to the delivery location may change based on the various factors. For example, a delivery recipient may prefer a first delivery path along a driveway to a delivery location of his front door if the delivery recipient is home. However, when the delivery recipient is not home, he may not have preferred flight path for the drone to follow.

Figure 6:
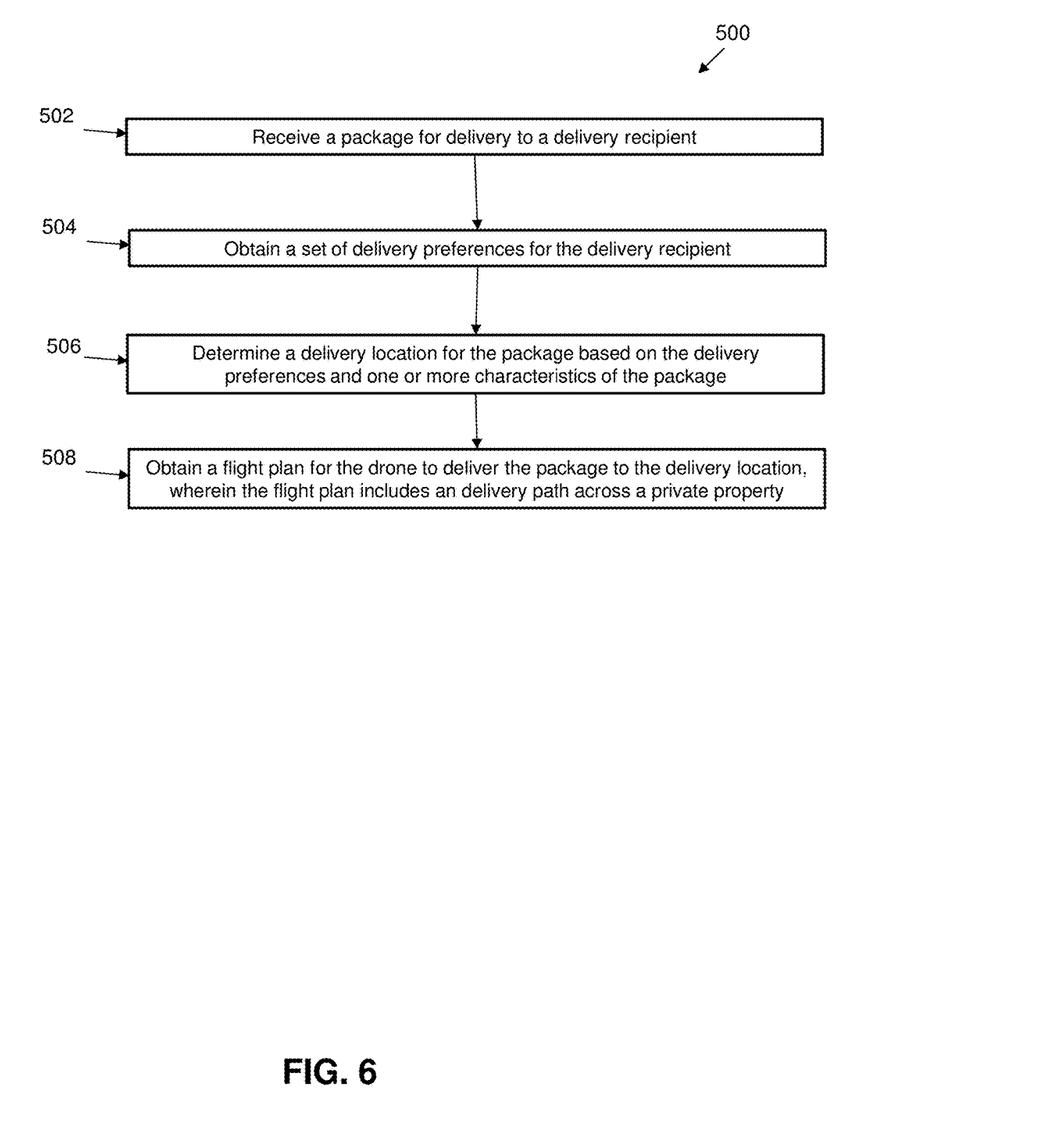
FIG. 6 depicts a flow diagram of a method of delivering a package by a drone using a customized delivery path in accordance with an embodiment.

Referring now to FIG. 6, a flow diagram of a method 500 for delivering a package by a drone using a customized delivery path in accordance with an embodiment is shown. As illustrated at block 502, the method 500 includes receiving a package for delivery to a delivery recipient. Next, as shown at block 504, the method includes obtaining a set of delivery preferences for the delivery recipient. In exemplary embodiments, the delivery preferences can include correlations between the one or more delivery locations and one or more of a weather condition at a time of the delivery, a location of the delivery recipient at a time of the delivery, a time of the delivery, and one or more characteristics of the package.

The method 500 also includes determining a delivery location for the package based on the delivery preferences and one or more characteristics of the package, as shown at block 506. In one embodiment, the one or more characteristics of the package can include one or more of a size of the package, a weather resistance of the package, and a value of the package. In exemplary embodiments, the delivery location can be further determined based on a weather condition at a time of the delivery, a location of the delivery recipient at a time of the delivery and a time of the delivery. Next, as shown at block 508, the method 500 includes obtaining a flight plan for the drone to deliver the package to the delivery location. The flight plan includes a delivery path across a private property and can also include a width, a maximum altitude, a minimum altitude, a maximum flight speed and a minimum flight speed along the flight path. Once the flight plan is obtained, the package can be delivered to the delivery location along the delivery path by the drone.

Figure 7:
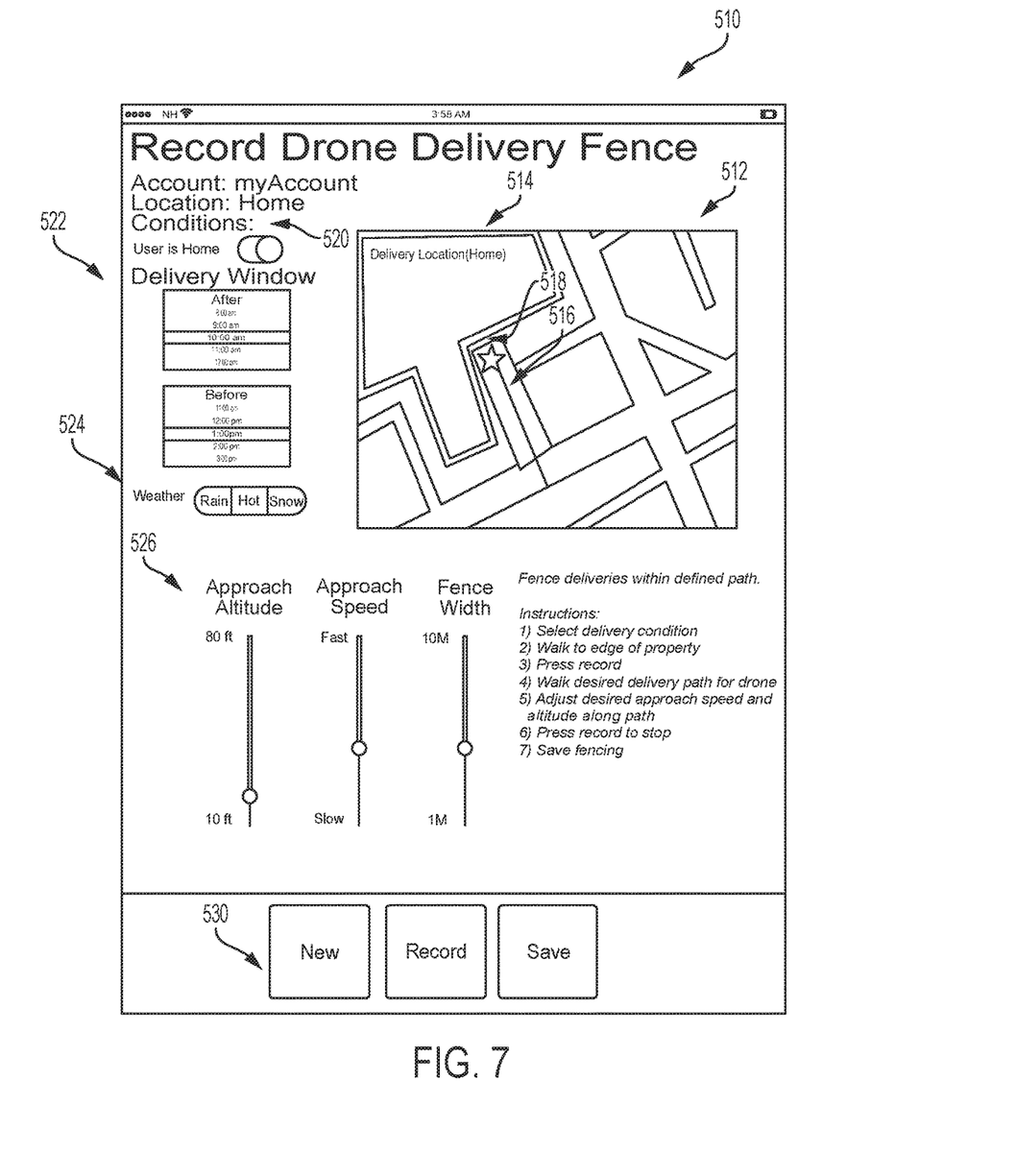
FIG. 7 depicts a user interface for an application for creating customized delivery paths for unmanned aerial vehicle deliveries in accordance with an embodiment.

Referring now to FIG. 7, a user interface 510 for an application for creating customized delivery paths for unmanned aerial vehicle deliveries in accordance with an embodiment is shown. In exemplary embodiments, the user interface 510 can be displayed on a mobile device such as a smartphone or tablet. The user interface 510 includes map 512 that illustrates a property 514 and a delivery recipient, i.e., the user of the application, can mark one or more delivery locations 518 and delivery paths 516 on the map 512. The user interface 510 also include controls that allow the user to specify the preferences that correlate to the delivery location 518 and the delivery path 516 shown in the map 512. For example, the user can set a user home at the time of delivery preference 520, a delivery window time preference 522, a weather condition preference 524. In addition, the user interface 510 includes controls 526 for specifying characteristics along the flight path, such as the altitude, speed, and width along the flight path. In exemplary embodiments, the user interface 510 includes one or more one or more command buttons 530, such as a new button, a record button, and a save button that can be used to create and save the delivery paths 516, the delivery locations and the associated preferences and flight path characteristics.

It should be appreciated that while embodiments herein refer to a controller 100 as controlling and managing the UAVs, this is for exemplary purposes and the claims should not be so limited. In other embodiments, the controlling and managing of the UAVs may be performed by a plurality of controllers, a distributed computing environment or a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
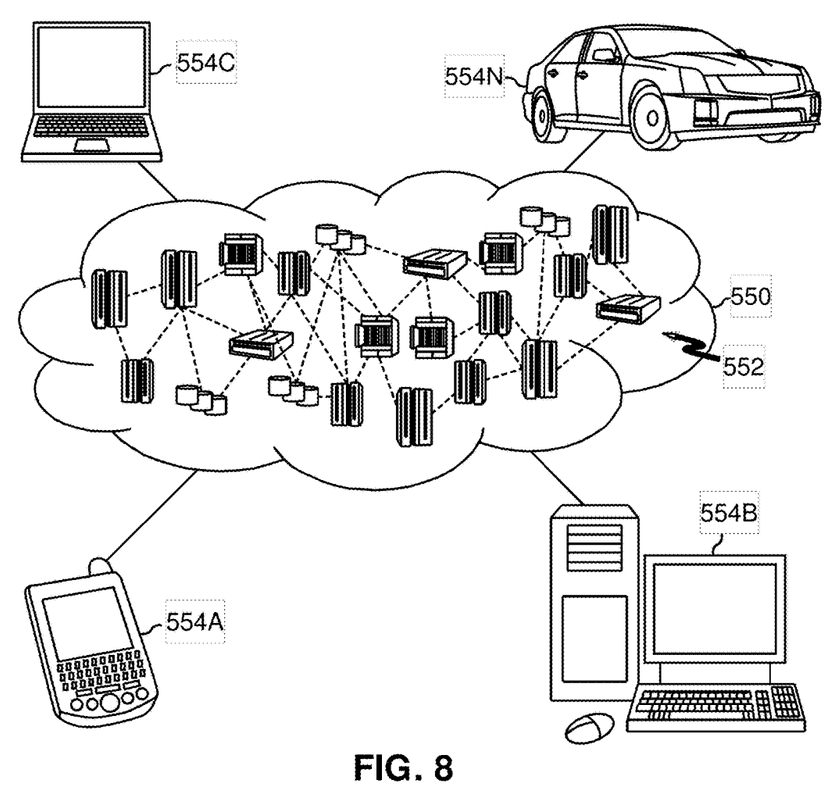
FIG. 8 depicts a cloud computing environment according to an embodiment of the present invention.

Referring now to FIG. 8, illustrative cloud computing environment 550 is depicted. As shown, cloud computing environment 350 comprises one or more cloud computing nodes 552 with which local computing devices used by cloud consumers, such as, for example, personal digital assistant (PDA) or cellular telephone 554A, desktop computer 554B, laptop computer 554C, and/or automobile computer system 554N may communicate. Nodes 552 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 12 are intended to be illustrative only and that computing nodes 552 and cloud computing environment 550 can communicate with any type of computerized device over any type of network and/or network addressable connection (e.g., using a web browser).

Figure 9:
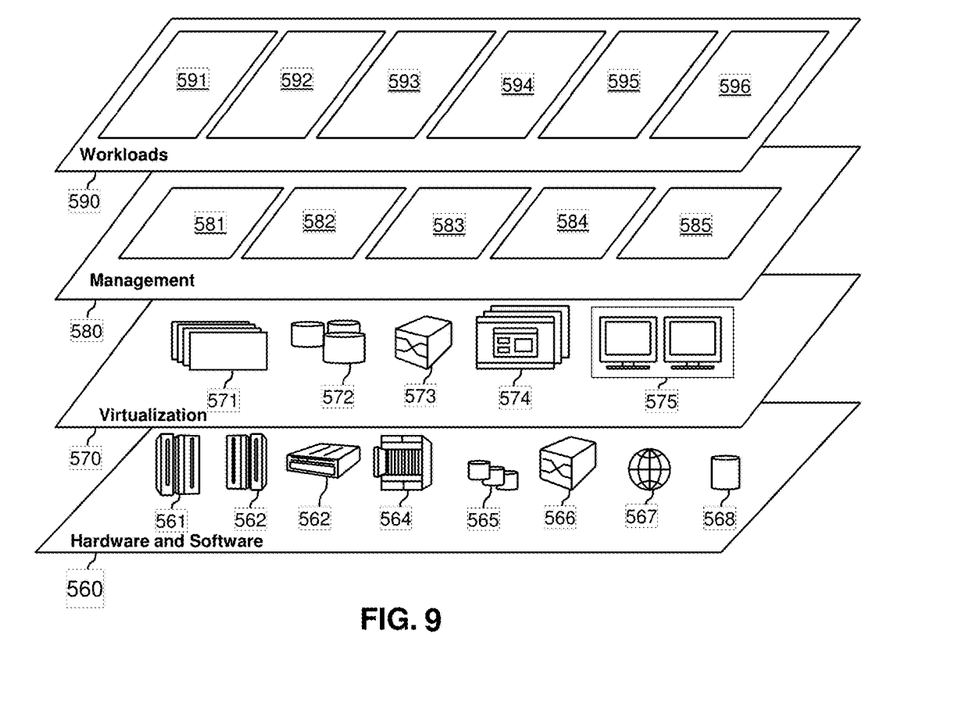
FIG. 9 depicts abstraction model layers according to an embodiment of the present invention.

Referring now to FIG. 9, a set of functional abstraction layers provided by cloud computing environment 550 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provides pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and a UAV positioning and monitoring management 596. The UAV positioning and monitoring management 596 may perform one or more methods that allow monitoring of a person or persons, such as but not limited to the methods described in reference to FIG. 4 and FIG. 6 for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating customized delivery paths for unmanned aerial vehicle deliveries, the method comprising:
   receiving, from a delivery recipient, one or more delivery locations for a delivery of a package;
   receiving, from the delivery recipient, a plurality of flight plans associated with each of the one or more delivery locations, wherein each of the plurality of flight plans includes an authorized path across a private property;
   receiving, from the delivery recipient, a set of delivery recipient preferences that are used to determine which of the one or more delivery locations and which of the plurality of flight plans should be used to deliver the package;
   obtaining, by a processor, a current location of the delivery recipient;
   determining, by the processor, a delivery location from the one or more delivery locations for the package and a flight plan from the plurality of flight plans based on the delivery preferences and the current location of the delivery recipient; and delivering the package to the delivery location by instructing the drone to fly along the flight plan.

2. The method of claim 1, wherein each of the flight plans includes a delivery path having a width along the delivery path, a speed along the delivery path and an altitude along the delivery path.

3. The method of claim 2, wherein the delivery path is a path along one or more waypoints, each having a specified latitude and longitude.

4. The method of claim 3, wherein each of the one or more waypoints is specified by capturing the specified latitude and longitude using a portable electronic device.

5. The method of claim 3, wherein each of the one or more waypoints is specified by marking a location on an electronic map.

6. The method of claim 1, wherein the set of delivery recipient preferences includes a correlation between the one or more delivery locations and one or more characteristics of the package.

7. The method of claim 1, wherein the set of delivery recipient preferences includes a correlation between the one or more delivery locations and a weather condition at a time of the delivery.

8. The method of claim 1, wherein the set of delivery recipient preferences includes a correlation between the one or more delivery locations and a time of the delivery.

9. A system for creating customized delivery paths for unmanned aerial vehicle deliveries comprising:

a memory having computer readable instructions; and one or more processors for executing the computer readable instructions, the computer readable instructions comprising:

receiving, from a delivery recipient, one or more delivery locations for a delivery of a package;

receiving, from the delivery recipient, a plurality of flight plans associated with each of the one or more delivery locations, wherein each of the plurality of flight plans includes an authorized path across a private property;

receiving, from the delivery recipient, a set of delivery recipient preferences that are used to determine which of the one or more delivery locations and which of the plurality of flight plans should be used to deliver the package; and obtaining, by a processor, a current location of the delivery recipient;

determining, by the processor, a delivery location from the one or more delivery locations for the package and a flight plan from the plurality of flight plans based on the delivery preferences and the current location of the delivery recipient; and delivering the package to the delivery location by instructing the drone to fly along the flight plan.

10. The system of claim 9, wherein each of the flight plans includes a delivery path having a width along the delivery path, a speed along the delivery path and an altitude along the delivery path.

11. The system of claim 10, wherein the delivery path is a path along one or more waypoints, each having a specified latitude and longitude.

12. The system of claim 11, wherein each of the one or more waypoints is specified by capturing the specified latitude and longitude using a portable electronic device.

13. The system of claim 11, wherein each of the one or more waypoints is specified by marking a location on an electronic map.

14. The system of claim 9, wherein the set of delivery recipient preferences includes a correlation between the one or more delivery locations and one or more characteristics of the package.

15. The system of claim 9, wherein the set of delivery recipient preferences includes a correlation between the one or more delivery locations and a weather condition at a time of the delivery.

16. A computer program product for creating customized delivery paths for unmanned aerial vehicle deliveries, the computer program product comprising a computer readable storage medium having program instructions embodied therewith, the program instructions executable by a processor to cause the processor to:

receive, from a delivery recipient, one or more delivery locations for a delivery of a package;

receive, from the delivery recipient, a plurality of flight plans associated with each of the one or more delivery locations, wherein each of the plurality of flight plans includes an authorized path across a private property;

receive, from the delivery recipient, a set of delivery recipient preferences that are used to determine which of the one or more delivery locations and which of the plurality of flight plans should be used to deliver the package; and obtain a current location of the delivery recipient;

determine, by the processor, a delivery location from the one or more delivery locations for the package and a flight plan from the plurality of flight plans based on the delivery preferences and the current location of the delivery recipient; and deliver the package to the delivery location by instructing the drone to fly along the flight plan.

17. The computer program product of claim 16, wherein each of the flight plans includes a delivery path having a width along the delivery path, a speed along the delivery path and an altitude along the delivery path.

18. The computer program product of claim 17, wherein the delivery path is a path along one or more waypoints, each having a specified latitude and longitude.

19. The computer program product of claim 18, wherein each of the one or more waypoints is specified by capturing the specified latitude and longitude using a portable electronic device.

* * * * *